United States Patent Office.

ADOLF HOLLNER, OF DENNISON, OHIO.

COMPOSITION OF MATTER FOR LINING OR COATING BOXES, &c.

SPECIFICATION forming part of Letters Patent No. 326,115, dated September 15, 1885.

Application filed March 19, 1885. (No specimens.)

*To all whom it may concern:*

Be it known that I, ADOLF HOLLNER, of Dennison, in the county of Tuscarawas and State of Ohio, have invented a new and Improved Composition of Matter for Lining or Coating Boxes and other Receptacles, of which the following is a full, clear, and exact description.

This invention, although applicable to boxes or other receptacles for containing various substances from which it is desirable to exclude the air or moisture and to preserve any aroma that may be attached to them, is more particularly designed to be applied to boxes or receptacles for packing coffee, including ground or roasted coffee, sample coffee pressed and glazed in the form of cakes, coffee in the berry or coffee in any other shape, whether put up loose or in paper or other wrappers, and in which it is desirable to preserve the flavor or aroma of the coffee. The receptacles to which the composition of matter or compound is more particularly intended to be applied as a lining or coating are paper or card-board boxes, boxes made of water-proof pasteboard, wood, or other material, and it is intended to apply the compound both to the bodies and lids of said boxes.

My improved compound consists of the following ingredients combined in or about the proportions stated, viz: glue, one pound; skimmed milk, two quarts; calcareous material, (chalk, &c.,) four ounces.

I take, for instance, glue (common or Cook's white) in the proportion of one pound, and dissolve the same in two quarts of skimmed milk, and after the same has been dissolved mix therewith four ounces of calcareous material, including chalk, powdered limestone, Spanish whiting, &c. Of course these proportions may be more or less varied; but I have found the above proportions to effect the desired result. After the compound has been thoroughly mixed it may be applied, either hot or cold, by a brush or otherwise, in any number of layers successively to the inside of the body of the box and its cover, allowing each layer to dry before applying a succeeding one, and after the coffee or other substance to be preserved has been packed in the box the cover may be glued or cemented to make a close joint; or the compound may be applied to more or less of the exterior as well as the interior of the box, if desired.

Previously to applying the compound to the box or receptacle the surface to which it is to be applied may be covered with any suitable body mixture, in one or more layers, to receive the compound on or over it, and in which powdered chalk, powdered limestone, powdered marble, Spanish whiting, powdered calcic carbonate, cement, or any of the above-named substances, with or without powdered alabaster and powdered anhydrite or other substances, may be incorporated. The first coating of the compound may then be applied, and after this powdered chalk, or any of the ingredients above named, be distributed over it, and then the compound be applied again, and so on for any number of coats, the powdered chalk, &c., forming a middle layer and contributing to make a body.

The compound should be put on sufficiently thick to avoid breaking.

Having thus described my invention, what I claim as new, and desire to secure by Letters Patent, is—

The herein-described compound to be used as a lining or coating for boxes and other receptacles, consisting of glue, skimmed milk, and calcareous material or materials in or about the proportions specified.

ADOLF HOLLNER.

Witnesses:
B. T. CLARK,
C. H. COLEMAN.